US006659062B1

(12) United States Patent
Issler

(10) Patent No.: US 6,659,062 B1
(45) Date of Patent: Dec. 9, 2003

(54) COOLED PISTON FOR INTERNAL COMBUSTION ENGINES

(75) Inventor: Wolfgang Issler, Schwaikheim (DE)

(73) Assignee: Mahle GmbH, Stuttgart (DE)

( * ) Notice: Subject to any disclaimer, the term of this patent is extended or adjusted under 35 U.S.C. 154(b) by 0 days.

(21) Appl. No.: 10/009,506

(22) PCT Filed: Apr. 14, 2000

(86) PCT No.: PCT/DE00/01169

§ 371 (c)(1),
(2), (4) Date: Dec. 5, 2001

(87) PCT Pub. No.: WO00/77379

PCT Pub. Date: Dec. 21, 2000

(30) Foreign Application Priority Data

Jun. 11, 1999 (DE) ........................................ 199 26 568

(51) Int. Cl.[7] ................................................ B23P 15/10
(52) U.S. Cl. .................................................... 123/193.6
(58) Field of Search ....................................... 123/193.6

(56) References Cited

U.S. PATENT DOCUMENTS

| | | | | |
|---|---|---|---|---|
| 4,986,167 A | | 1/1991 | Stratton et al. | |
| 5,261,363 A | * | 11/1993 | Kemnitz | 123/193.6 |
| 5,357,920 A | * | 10/1994 | Kemnitz et al. | 123/193.6 |
| 5,546,896 A | * | 8/1996 | Zaiser | 123/193.6 |
| 5,778,846 A | * | 7/1998 | Mielke | 123/193.6 |
| 6,202,619 B1 | * | 3/2001 | Keller et al. | 123/193.6 |
| 6,453,797 B1 | * | 9/2002 | Bauer | 123/193.6 |

FOREIGN PATENT DOCUMENTS

| | | |
|---|---|---|
| DE | 252 638 | 12/1987 |
| DE | 39 91 677 | 8/1989 |
| DE | 41 34 530 | 5/1992 |
| DE | 40 39 751 | 6/1992 |
| DE | 42 08 037 | 9/1993 |
| DE | 40 39 754 | 6/1998 |
| DE | 197 20 958 | 11/1998 |
| WO | WO90/14515 | 11/1990 |

* cited by examiner

*Primary Examiner*—Marguerite McMahon
(74) *Attorney, Agent, or Firm*—Collard & Roe, P.C.

(57) ABSTRACT

The invention relates to a piston for internal combustion engines whose piston head presents an annular cooling channel which on its end open towards the piston shaft is closed off by an appropriately shaped wall element which is radially divided in at least one place. The aim of the invention is to improve heat dissipation in such a piston. To this end the periphery of the wall element is provided with several radially arranged, evenly distributed transverse walls which extend axially into the cooling channel.

4 Claims, 2 Drawing Sheets

COOLED PISTON FOR INTERNAL COMBUSTION ENGINES

CROSS REFERENCE TO RELATED APPLICATIONS

Applicant claims priority under 35 U.S.C. §119 of German Application No. 199 26 568.2 filed Jun. 11, 1999. Applicant also claims priority under 35 U.S.C. §120 of PCT/DE00/01169 filed Apr. 14, 2000. The international application under PCT article 21(2) was not published in English.

The invention relates to a cooled piston for internal combustion engines with the features specified in the introductory part of claim 1.

Such pistons are known from DD 252 638 A1 and DE 41 34 530 A1, in connection with which the part of the wall serving for covering the downwardly open, ring-shaped cooling channel extending all around is realized in the form of an open sheet metal ring. Making use of its elastic deformation according to the Seeger ring principle, i.e. with initial tension in the radial direction, said ring is inserted in a groove extending on the inner circumference of the piston ring zone or outer circumference of the wall of the combustion chamber.

A piston crown part is known DE 42 08 037 C2 in connection with which the downwardly open cooling channel is covered by a fixed, tensioned cup spring. Said spring is divided in at least two parts and radially rests freely on the inside and outside against abutments on axially opposed sides.

A piston with a cooling channel in the crown of the piston is known from DE 39 91 677 T1, in connection with which provision is made for a baffle plate covering the lower open end of the cooling channel. The ends of said baffle plate are vertically bent off upwards in the zone of division in order to maintain a defined level of cooling oil in the cooling channel.

The drawback with the above embodiments is that the dwelling time of the cooling oil in the cooling channel has not been solved in a satisfactory manner to the desired extent.

Therefore, the invention is based on the problem of prolonging the dwelling time of the cooling oil in the cooling channel and to reinforce the Shaker effect of the cooling oil in order to achieve superior heat dissipation in the zones of the piston to be cooled.

Said problem is solved in connection with a piston of the type specified above by the features according to the characterizing part of claim 1.

Other useful variations according to the invention are contained in the dependent claims.

The invention is explained in greater detail in the following with the help of exemplified embodiments shown in the drawing, in which.

Figure 1:
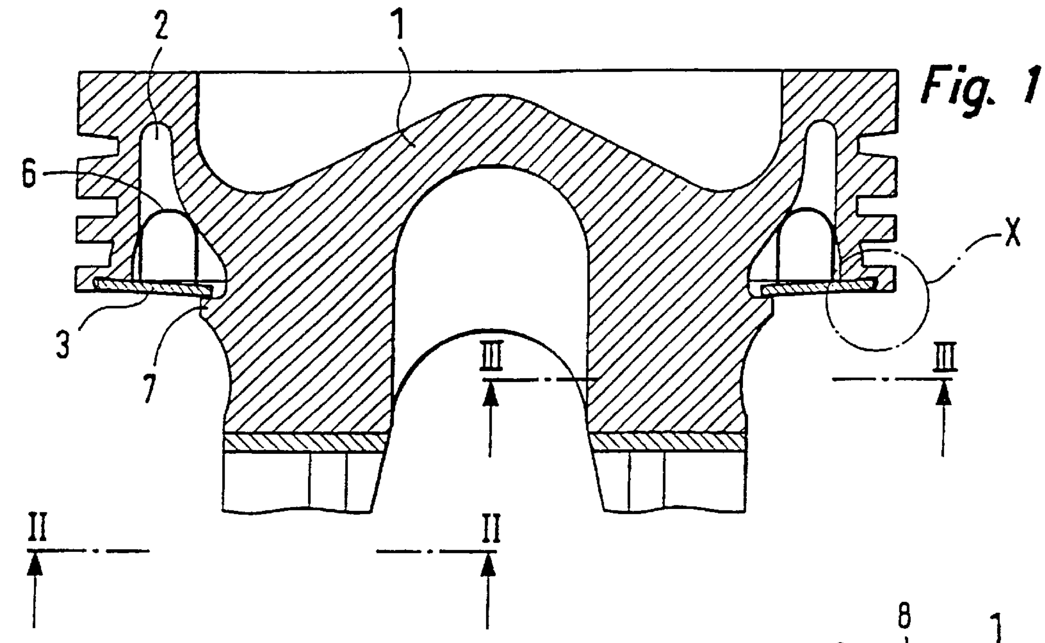
FIG. 1 is a sectional side view of a piston crown.
Figure 3:
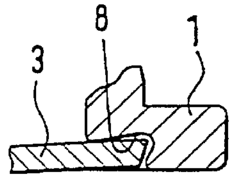
FIG. 3 is an enlarged representation of the view X of FIG. 1.
Figure 2:
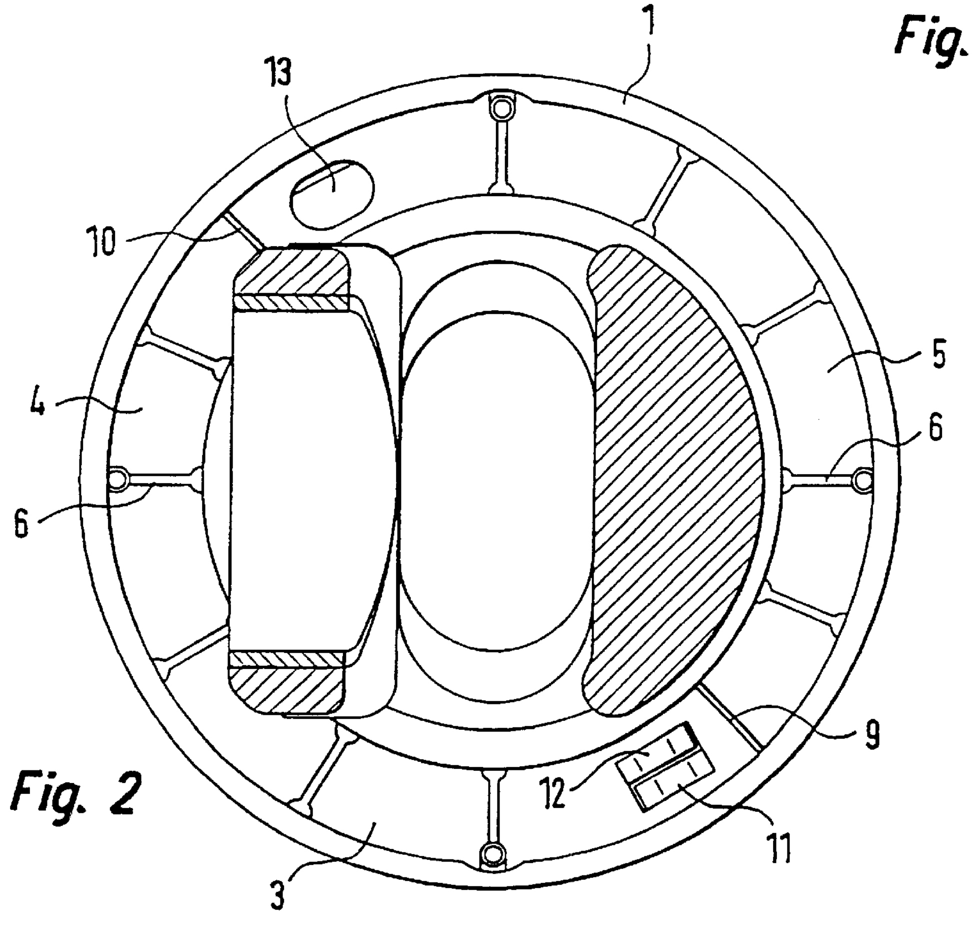
FIG. 2 shows a bottom view of FIG. 1, the left half according to section II—II, the right half according to section III—III.
Figure 4:
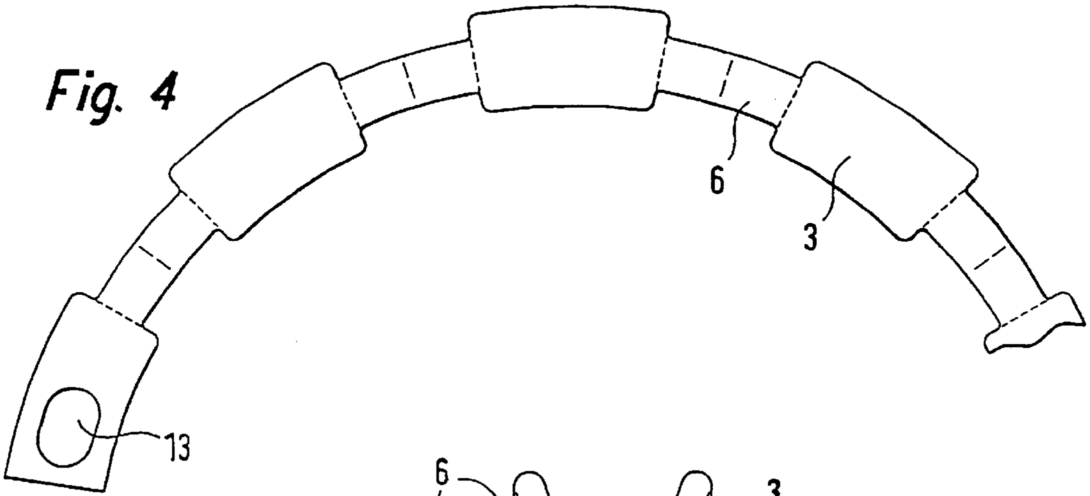
FIG. 4 is a partial view of a wall element according to the invention before it has been reshaped.
Figure 5:
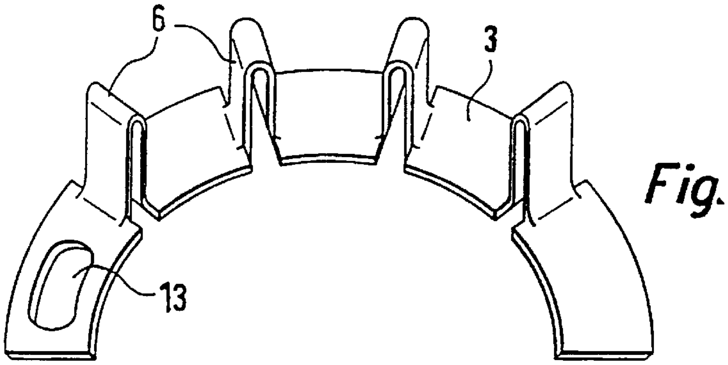
FIG. 5 is a partial view of the wall element after it has been reshaped.
Figure 6:
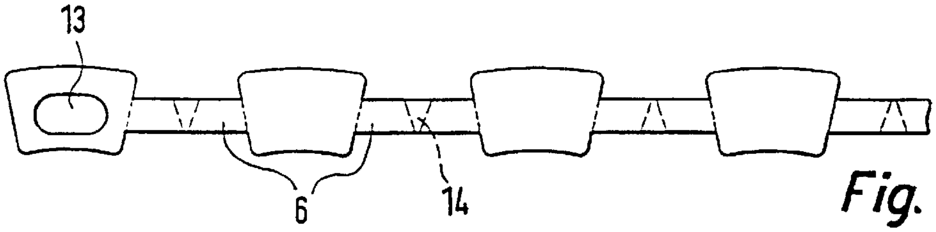
FIG. 6 is a partial view (layout) of another embodiment of the wall element before it has been reshaped.
Figure 7:
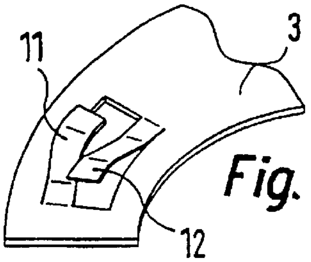
FIG. 7 is a partial view of a wall element with a feed opening for the cooling oil.
Figure 9:
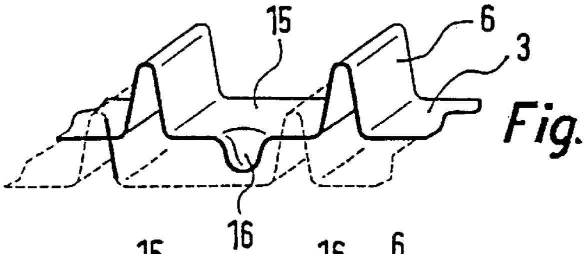
FIG. 9 is a partial view of another embodiment according to section IX—IX.
Figure 8:
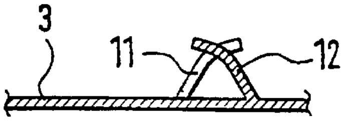
FIG. 8 is a side view according to FIG. 7.
Figure 10:
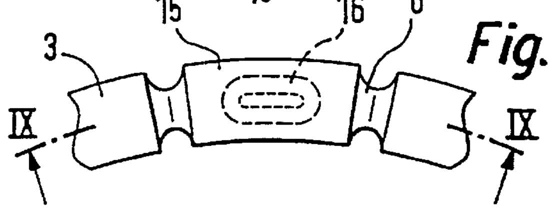
FIG. 10 is a top view according to FIG. 9.

A cooled piston is comprised of a piston crown 1 and a piston shaft (not drawn). Said shaft is connected with said piston crown in a hinged manner via a piston pin (not shown). In the piston crown 1, provision is made for a cooling channel 2 extending all around in the form of a ring. Said cooling channel is closed at its end that is closed toward the piston shaft, by a wall element 3, for example a cup spring divided in two parts, or in two sheet metal strip halves 4, 5. In order to prolong the dwelling time of the cooling oil in the cooling channel 2 and to achieve in this way superior dissipation of the heat from the zones of the piston to be cooled, the wall element 3 is provided with a plurality of the radially arranged transverse walls 6. Said transverse walls are distributed over the periphery of said wall element and axially extend into the cooling channel 2, so that defined Shaker chambers are formed in this manner. The wall element 3 is supported in the piston crown in the manner known per se, such as for example by providing an abutment 7 for the inner periphery and a corresponding collar-like recess 8 for the outer periphery of the wall element 3. The wall element 3 is divided by the radial divisions 9, 10 in the two metal sheet strip halves 4, 5, which, under initial tension, form the lower termination of the cooling channel 2. For feeding cooling oil, two part pieces 11, 12 in the first sheet metal half 4, which are bent off upwards in an inclined manner, are disengaged in such a manner that the jet of cooling oil is divided, causing about one half of the oil jet to enter the cooling channel 2 in the one direction and the other half in the opposite direction.

The flow of oil then circulates peripherally in the cooling channel and is discharged again by way of a discharge opening 13 provided in the second half 5 of the sheet metal strip.

Following said path from the inlet into to the outlet from the cooling channel 2, the flow of oil is brought into contact with the piston zones to be cooled a number of times in a Shaker-like manner by the transverse walls 6, which form a type of chambers, and also due to the movement of stroke of the piston, so that good heat transfer from said zones into the cooling oil is achieved.

The transverse walls 6 of the wall element 3 can be produced in a simple manner by reshaping them. Such re-forming can be based, for example on a ring-shaped, punched-out plane wall element 3, or a straight plane wall element 3, whereby the folding 14 has to be produced in connection with the straight starting strip in such a manner that a ring-shaped wall element 3 is subsequently obtained.

In another embodiment, a deepening 16 is produced by molding in the direction of the piston shaft for enlarging the Shaker chamber in the plane area 15 of the wall element 3.

With such an embodiment, superior heat dissipation is, achieved in a piston with a cooling channel in a constructively simple manner.

What is claimed is:

1. A cooled piston for internal combustion engines comprising a cooling channel extending all around in the piston crown, whereby the cooling channel is closed at its end that is open toward the piston shaft, by a correspondingly shaped wall element, said wall element being secured on the piston and being radially divided at least once, wherein the wall element is provided with a plurality of radially arranged transverse walls distributed over its periphery and axially extending into the cooling channel and with part pieces bent off upwards in an inclined manner and disengaged from the wall element, each of said pieces extending in an approximately S-shaped form.

2. The cooled piston according to claim 1, wherein the transverse walls form one piece with the wall element.

3. The cooled piston according to claim 1, wherein the transverse walls are produced by reshaping a wall element comprising a metal sheet, which is planar in its original state.

4. A cooled piston for internal combustion engines comprising a cooling channel extending all around in the piston crown, whereby the cooling channel is closed at its end that is open toward the piston shaft, by a correspondingly shaped wall element, said wall element being secured on the piston and being radially divided at least once, wherein the wall element is provided with a plurality of radially arranged transverse walls distributed over its periphery and axially extending into the cooling channel and a deepening is molded in the direction of the piston shaft in a planar area between two transverse walls.

* * * * *